United States Patent
Kemmerling et al.

(10) Patent No.: US 10,487,756 B2
(45) Date of Patent: Nov. 26, 2019

(54) AUTO-IGNITION INTERNAL COMBUSTION ENGINE SUITABLE FOR HCCI OPERATION, AND METHOD FOR OPERATING AN INTERNAL COMBUSTION ENGINE OF SAID TYPE

(71) Applicant: Ford Global Technologies, LLC, Dearborn, MI (US)

(72) Inventors: Joerg Kemmerling, Monschau (DE); Frank Wunderlich, Herzogenrath (DE); Hanno Friederichs, Aachen (DE); Andreas Kuske, Geulle (NL); Helmut Matthias Kindl, Aachen (DE); Vanco Smiljanovski, Bedburg (DE); Franz Arnd Sommerhoff, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 15/422,297

(22) Filed: Feb. 1, 2017

(65) Prior Publication Data
US 2017/0226938 A1     Aug. 10, 2017

(30) Foreign Application Priority Data
Feb. 5, 2016   (DE) .................. 10 2016 201 770

(51) Int. Cl.
*F02D 37/02*     (2006.01)
*F02D 41/30*     (2006.01)
(Continued)

(52) U.S. Cl.
CPC ............. *F02D 37/02* (2013.01); *F01N 3/021* (2013.01); *F01N 3/101* (2013.01); *F01N 3/106* (2013.01);
(Continued)

(58) Field of Classification Search
CPC .. Y02T 10/128; F02B 37/013; F02D 41/3035; F02D 2041/3052
See application file for complete search history.

(56) References Cited

U.S. PATENT DOCUMENTS

| 5,233,830 A * | 8/1993 | Takeshima ............ F01N 3/2053 422/171 |
| 5,881,693 A * | 3/1999 | Mizuno ............... F02D 41/1498 123/295 |

(Continued)

FOREIGN PATENT DOCUMENTS

| DE | 102014201685 A1 | 7/2015 | |
| EP | 0758714 A1 * | 2/1997 | ........... F01N 3/2053 |

*Primary Examiner* — Laert Dounis
(74) *Attorney, Agent, or Firm* — Geoffrey Brumbaugh; McCoy Russell LLP

(57) ABSTRACT

Methods and systems are provided for an auto-ignition internal combustion engine comprising an exhaust gas recirculation arrangement, an intake system, and an exhaust gas discharge system for the discharge of exhaust gases, in which the internal combustion engine is operable, at least in a first, stoichiometric operating mode, by way of a spatial ignition method (HCCI mode). For the aftertreatment of the exhaust gas in the first operating mode, a three-way catalytic converter is provided in the exhaust gas discharge system for reducing nitrogen oxides and oxidizing unburned hydrocarbons and carbon monoxide. In this way, the auto-ignition internal combustion engine has a greater window of operation in the HCCI mode than conventional auto-ignition internal combustion engines.

19 Claims, 4 Drawing Sheets

(51) Int. Cl.
  *F02M 26/26*  (2016.01)
  *F01N 3/021*  (2006.01)
  *F01N 3/10*   (2006.01)
  *F02D 41/02*  (2006.01)
  *F01N 13/00*  (2010.01)
  *F02B 1/12*   (2006.01)
  *F02B 37/04*  (2006.01)
  *F02B 37/18*  (2006.01)
  *F02B 39/10*  (2006.01)
  *F01N 3/20*   (2006.01)
  *F02B 29/04*  (2006.01)
  *F02B 37/24*  (2006.01)
  *F02D 41/00*  (2006.01)
  *F02M 26/06*  (2016.01)
  *F02M 26/23*  (2016.01)

(52) U.S. Cl.
  CPC ......... *F01N 3/2053* (2013.01); *F01N 13/011* (2014.06); *F02B 1/12* (2013.01); *F02B 29/0406* (2013.01); *F02B 37/04* (2013.01); *F02B 37/18* (2013.01); *F02B 37/24* (2013.01); *F02B 39/10* (2013.01); *F02D 41/0007* (2013.01); *F02D 41/0077* (2013.01); *F02D 41/0235* (2013.01); *F02D 41/3035* (2013.01); *F02M 26/26* (2016.02); *F01N 2570/10* (2013.01); *F01N 2570/12* (2013.01); *F01N 2570/14* (2013.01); *F02M 26/06* (2016.02); *F02M 26/23* (2016.02); *Y02T 10/128* (2013.01); *Y02T 10/144* (2013.01); *Y02T 10/146* (2013.01); *Y02T 10/22* (2013.01)

(56) References Cited

U.S. PATENT DOCUMENTS

| | | | | |
|---|---|---|---|---|
| 6,155,227 | A  * | 12/2000 | Shimada | F02D 41/0057 123/295 |
| 6,295,973 | B1 * | 10/2001 | Yang | F02B 1/12 123/543 |
| 6,390,054 | B1 * | 5/2002  | Yang | F02B 1/04 123/295 |
| 6,973,786 | B1 * | 12/2005 | Liu  | F02M 26/07 123/559.2 |
| 8,955,498 | B2   | 2/2015  | Kerns et al. | |
| 2002/0121263 | A1 * | 9/2002 | Chmela | F02B 1/12 123/295 |
| 2008/0127931 | A1 * | 6/2008 | Kuo | F02B 1/12 123/25 C |
| 2008/0178843 | A1 * | 7/2008 | Duffy | F02B 29/0412 123/435 |
| 2013/0104543 | A1 | 5/2013 | Zoldak et al. | |
| 2013/0333663 | A1 * | 12/2013 | Chen | F02D 17/02 123/334 |
| 2014/0041367 | A1 * | 2/2014 | Balthes | F01N 3/035 60/274 |
| 2014/0230430 | A1 * | 8/2014 | Krug | F02B 29/0412 60/600 |
| 2014/0352670 | A1 | 12/2014 | Surnilla et al. | |
| 2015/0047347 | A1 * | 2/2015 | Ulrey | F02M 26/07 60/605.2 |
| 2015/0053171 | A1 | 2/2015 | Sasaki | |

\* cited by examiner

AUTO-IGNITION INTERNAL COMBUSTION ENGINE SUITABLE FOR HCCI OPERATION, AND METHOD FOR OPERATING AN INTERNAL COMBUSTION ENGINE OF SAID TYPE

CROSS REFERENCE TO RELATED APPLICATION

The present application claims priority to German Patent Application No. 102016201770.5, filed on Feb. 5, 2016. The entire contents of the above-referenced application are hereby incorporated by reference in its entirety for all purposes.

FIELD

The present description relates generally to systems and methods for an auto-ignition internal combustion engine having an exhaust gas recirculation arrangement, an intake system for the supply of charge air to the internal combustion engine, and an exhaust gas discharge system for the discharge of exhaust gases, in which the internal combustion engine is operable, at least in a first operating mode, by way of a spatial ignition method (HCCI mode).

BACKGROUND/SUMMARY

An auto-ignition internal combustion engine may be used as a motor vehicle drive unit. Within the context of the present disclosure, the expression "internal combustion engine" encompasses diesel engines, which utilize a combustion process with auto-ignition, and hybrid drives comprising the auto-ignition internal combustion engine and also an electric machine that can be connected in terms of drive to the internal combustion engine and receives power from the internal combustion engine or, as a switchable auxiliary drive, additionally outputs power.

On account of the limited availability of mineral oil as raw material for the production of fuels and the increase of global warming as a result of the greenhouse effect, it is constantly sought in the development of internal combustion engines to minimize fuel consumption. Furthermore, a reduction of the pollutant emissions is fundamentally sought in order to comply with future limit values for pollutant emissions. Therefore, the development of fuel-consumption-optimized combustion methods is at the forefront of internal combustion engine development efforts.

A problem is fuel consumption owing to the relatively poor efficiency in particular of Otto-cycle engines. The reason for this lies in the principle of the operating process of the traditional Otto-cycle engine. The conventional diesel-engine method is afflicted, in particular, with high nitrogen oxide emissions due to high temperatures resulting from the combustion process and with high soot emissions owing to the inhomogeneous fuel-air mixture.

For reducing the emissions of an internal combustion engine, a distinction can be made between two fundamentally different approaches.

A first approach for reducing the emissions includes aftertreatment of the exhaust gas that is formed during combustion, and of the pollutants contained therein. To reduce pollutant emissions, internal combustion engines may be equipped with various exhaust gas aftertreatment systems.

In a second approach, it is sought to influence the combustion process such that the fewest possible pollutants arise (e.g., are formed) during the combustion of the fuel in the first place. Since, for example, the formation of nitrogen oxides takes place during an excess of air and high temperatures, combustion methods with relatively low combustion temperatures are expedient for reducing nitrogen oxide emissions. Low combustion temperatures may be realized, for example, by increasing ignition retardation and/or reducing the rate of combustion. Both can be achieved by admixing combustion gases to a cylinder fresh charge and/or by increasing the exhaust gas fraction in the cylinder fresh charge. As a result, exhaust gas recirculation (EGR) is to be regarded as a suitable measure for lowering the combustion temperature. With increasing EGR rate, the nitrogen oxide emissions can be considerably reduced. Here, the nitrogen oxide emissions and also the soot emissions decrease.

For the stated reasons, an increasing number of new combustion methods are being developed and tested. An example of a combustion method of said type is the homogeneous charge compression ignition (HCCI) method, which is also referred to as the spatial ignition method or controlled auto-ignition (CAI) method and which is based on a controlled auto-ignition of the fuel supplied to a cylinder. Here, the fuel is generally burned with an excess of air (e.g., superstoichiometrically). Owing to the low combustion temperatures, an internal combustion engine operated in the HCCI mode exhibits relatively low nitrogen oxide emissions and likewise low, or virtually absent, soot emissions. Additionally, owing to the relatively low combustion temperatures and the associated relatively low temperature differences in the internal combustion engine, heat losses are lower than in the case of conventionally operated internal combustion engines. This leads to a higher thermal efficiency.

An HCCI method and an internal combustion engine that uses said method for the combustion of fuel are described in U.S. Pat. No. 6,390,054 B1, wherein the internal combustion engine that is used is an applied-ignition Otto-cycle engine.

However, the inventors herein have identified potential issues with such systems. As one example, the HCCI method cannot be used at all operating points of the internal combustion engine, such that the advantages described above can be utilized in a small region of the engine characteristic map (load versus engine speed). For example, the HCCI method can be used to a limited extent at relatively high loads and relatively high engine speeds. With increasing load, owing to the decreasing air ratio, the auto-ignition is shifted in an advancing direction, (e.g., the fuel-air mixture ignites at an earlier time in the compression phase), wherein the conversion rates and/or the rate of combustion likewise increase. Owing to the early ignition time, which is inconsistent, and in particular owing to the relatively fast rate of combustion, the running of the internal combustion engine becomes more irregular and rough. Furthermore, owing to the heat of combustion that is released long before the top dead center, the thermal efficiency is reduced. With increasing engine speed, the time that is available for the preparation of the fuel-air mixture, in particular for the homogenization, is shortened, such that, at high engine speeds, it is not possible for an adequately homogenized fuel-air mixture to be generated. Furthermore—assuming a successful auto-ignition—the focus of the combustion is shifted in a retarding direction, such that the thermal efficiency of the combustion process is impaired. This is also the reason why the internal combustion engine cannot be operated exclusively using the HCCI method, as a further combustion method is utilized so that the internal combustion engine can be operated at the operating points at which the HCCI method fails.

To make the HCCI method suitable for broad characteristic map regions, and to expand the range of use of said method, various concepts have been developed. In particular, it is sought, by various measures, to influence the temperature of the fresh charge supplied to the cylinder, for example, by way of an internal and/or external recirculation of exhaust gas. Despite these efforts, it has still not been possible to operate an internal combustion engine exclusively (e.g., at all operating points of the engine characteristic map) in accordance with the HCCI method, such that the use of other combustion methods aside from the HCCI method is unavoidable. Furthermore, if the temperature of the cylinder fresh charge, the control of the ignition time, and/or the control of the combustion profile are/is influenced by way of exhaust gas recirculation (EGR), a problem is posed in particular by the dynamic control of the EGR (e.g., the recirculation rate during transient operation of the internal combustion engine), wherein adequate dynamics (e.g., a satisfactory response behavior of the EGR) cannot be realized in a satisfactory manner. Further still, the HCCI method leads to relatively high emissions of carbon monoxide and unburned hydrocarbons.

The above-described problem is intensified in the case of internal combustion engines with exhaust gas turbocharging. If exhaust gas is extracted from the exhaust gas discharge system by way of high-pressure EGR upstream of the turbine, the recirculated exhaust gas is no longer available for driving the turbine, whereby the turbocharging is adversely affected. In the event of an increase in the EGR rate, the exhaust gas flow introduced into the turbine simultaneously decreases. The reduced exhaust gas mass flow through the turbine leads to a lower turbine pressure ratio. As a result, the charge pressure ratio also falls, which equates to a smaller compressor mass flow. Aside from the decreasing charge pressure, additional problems may arise in the operation of the compressor with regard to the surge limit of the compressor. Disadvantages may also arise in terms of the pollutant emissions, for example, with regard to the formation of soot during an acceleration in the case of diesel engines.

In the case of a low-pressure EGR arrangement, it is duly the case that exhaust gas that has already flowed through the turbine is recirculated into the intake system. However, owing to the relatively long paths to reach cylinders of the engine and larger volumes, the low-pressure EGR arrangement is more inert to transient changes. The low-pressure EGR arrangement also has a poorer response behavior, because, in the context of low-pressure EGR, exhaust gas is used which has undergone exhaust gas aftertreatment, in particular by a particle filter, downstream of the turbine. In this way, depositions in the compressor which change the geometry of the compressor, in particular the flow cross sections, and impair the efficiency of the compressor can be prevented. Further, the driving pressure gradient between the exhaust gas discharge system and the intake system is generally smaller in the case of a low-pressure EGR arrangement, such that it is not possible to realize arbitrarily high recirculation rates.

In one example, the issues described above may be at least partly addressed by a system for an auto-ignition internal combustion engine, comprising an exhaust gas recirculation arrangement; an intake system for supplying charge air to the auto-ignition internal combustion engine; an exhaust gas discharge system for the discharge of exhaust gas; and a three-way catalytic converter in the exhaust gas discharge system configured to reduce nitrogen oxides and oxidize unburned hydrocarbons and carbon monoxide in the exhaust gas when the internal combustion engine is operated in a stoichiometric first operating mode, in which the stoichiometric first operating mode is a homogenous charge compression ignition mode. In this way, an auto-ignition internal combustion engine may be operated in the HCCI mode with reduced pollutant emissions.

As one example, the system may further comprise an exhaust gas recirculation system, a bypass passage for bypassing a charge-air cooler, and a bypass passage for bypassing an intercooler. The bypass passages may be opened to reduce intake volume, thereby increasing EGR dynamics, and increase the temperature of the fresh charge. Thus, the system described herein may provide sufficient EGR dynamics and temperature control to control auto-ignition timing in the HCCI mode and increase the operating range of the HCCI mode.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
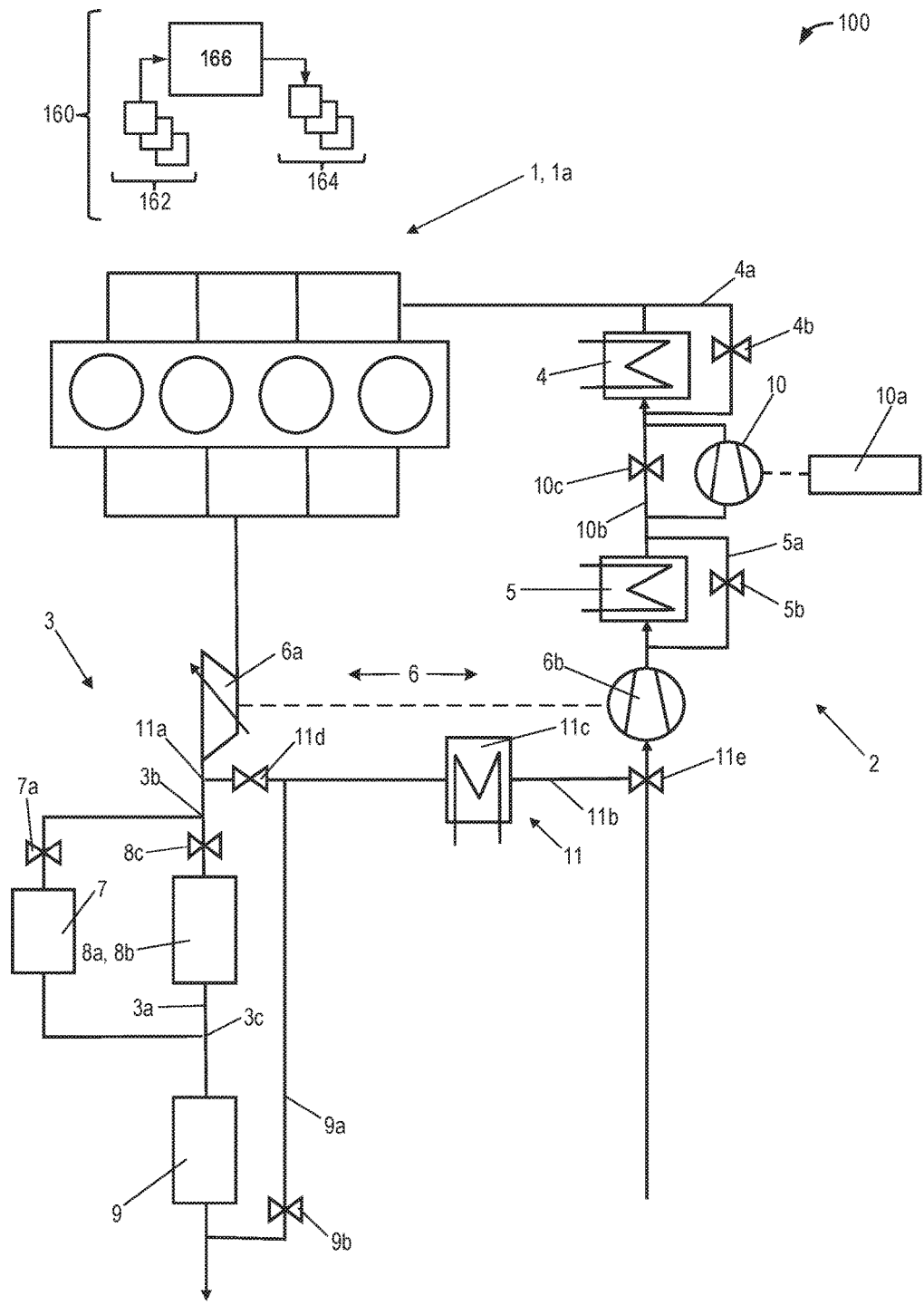
FIG. 1A schematically shows a first embodiment of the internal combustion engine, and FIG. 1B schematically shows the engine characteristic map associated with the internal combustion engine illustrated in FIG. 1A.

The following description relates to systems and methods for an auto-ignition internal combustion engine having an exhaust gas recirculation arrangement, an intake system for the supply of charge air to the internal combustion engine, and an exhaust gas discharge system for the discharge of exhaust gases, an example of which is illustrated in FIG. 1A. The internal combustion engine is operable, at least in a first operating mode, by way of a spatial ignition method (HCCI mode), as diagrammed in FIG. 1B. The internal combustion engine of the present disclosure is distinguished by the fact that, for the aftertreatment of the exhaust gas in the first operating mode, a three-way catalytic converter is provided in the exhaust gas discharge system to reduce nitrogen oxides and oxidize unburned hydrocarbons and carbon monoxide. An example method for operating the auto-ignition internal combustion engine in the first operating mode and in a second operating mode is illustrated in FIG. 2. Particularly in the first operating mode, components of the internal combustion engine may be adjusted in order to produce or maintain a desired combustion timing, as illustrated in the example diagram of FIG. 3.

According to the present disclosure, in the first operating mode, the internal combustion engine is operated by way of a spatial ignition method, and stoichiometrically. At stoichiometry, an air-fuel ratio ($\lambda$) is equal to one. In relation to the conventional superstoichiometric (k>1) HCCI operating mode of an internal combustion engine, the stoichiometric spatial ignition method of the first operating mode described herein has numerous advantages. Firstly, in the stoichiometric first operating mode, the exhaust gas can undergo aftertreatment by way of a three-way catalytic converter, which reduces nitrogen oxides ($NO_x$) and oxidizes unburned hydrocarbons (HC) and carbon monoxides (CO). Unlike a selective catalytic converter and a $NO_x$ storage catalytic converter, the three-way catalytic converter does not use additional reducing agents (e.g., ammonia from urea or unburned hydrocarbons from fuel) for the conversion of the pollutants. If fuel (e.g., unburned hydrocarbons) is used as the reducing agent, said unburned hydrocarbons may be introduced directly into the exhaust gas discharge system or by way of a post-injection of additional fuel into a cylinder of the internal combustion engine. Furthermore, fuel consumption increases as a result of the use of additional fuel as the reducing agent. Therefore, the use of a three-way catalytic converter may increase fuel efficiency. However, three-way catalytic converters are maximally efficient during stoichiometric operation of the internal combustion engine within narrow limits ($\lambda \approx 1$).

Secondly, in the stoichiometric first operating mode, the exhaust gas contains no or virtually no soot particles. As a result, the exhaust gas to be recirculated does not imperatively have to undergo exhaust gas aftertreatment, in particular, through a particle filter. The exhaust gas to be recirculated can be extracted untreated from the exhaust gas discharge system upstream of the three-way catalytic converter. In this way, the line paths are shortened and the line volumes reduced. The EGR arrangement is thereby less inert to transient changes in engine operation and exhibits increased response behavior. A pressure loss across the exhaust gas aftertreatment arrangement or the exhaust gas aftertreatment systems is eliminated, whereby a driving pressure gradient between the exhaust gas discharge system and the intake system is greater, such that high recirculation rates can be realized. The larger pressure gradient furthermore contributes to increased response behavior compared with conventional auto-ignition internal combustion engines operating in HCCI mode.

In this way, an auto-ignition internal combustion engine is provided that has an extended operation window in the HCCI mode and reduced pollutant emissions.

Even if it is not possible to entirely dispense with a selective catalytic converter or a nitrogen oxide storage catalytic converter for reducing the nitrogen oxides, the three-way catalytic converter provided according to the present disclosure nevertheless reduces the use or usage time of said exhaust gas aftertreatment systems and the amount of reducing agent used, specifically ammonia, urea, or fuel.

Embodiments of the auto-ignition internal combustion engine are advantageous in which the three-way catalytic converter is configured for exhaust gas flow rates that arise during part-load operation, which can be defined by a predetermined upper load and a predetermined upper engine speed. The three-way catalytic converter is of relatively small dimensions, is inexpensive, and permits dense packaging of the exhaust gas aftertreatment arrangement.

Embodiments of the auto-ignition internal combustion engine are advantageous in which a supercharging arrangement is provided. Supercharging is primarily a method for increasing performance in which the air used for the combustion process in the engine is compressed, resulting in a greater air mass fed to each cylinder in each working cycle. In this way, the fuel mass and therefore the mean pressure can be increased.

Supercharging is a suitable means for increasing power of an internal combustion engine while maintaining a swept volume or for reducing the swept volume while maintaining the power. In any case, supercharging leads to an increase in volumetric power output and a more expedient power-to-weight ratio. If the swept volume is reduced, it is thus possible to shift the load collective toward higher loads, at which the specific fuel consumption is lower. By means of supercharging in combination with a suitable transmission configuration, it is also possible to realize so-called downspeeding, with which it is likewise possible to achieve a lower specific fuel consumption. Supercharging consequently assists in efforts to develop internal combustion engines to minimize fuel consumption and increase the efficiency of the internal combustion engine.

For supercharging, use is often made of an exhaust gas turbocharger, in which a compressor and a turbine are arranged on the same shaft. The hot exhaust gas flow is fed to the turbine and expands in the turbine with a release of energy, which rotates the shaft. The energy supplied by the exhaust gas flow to the turbine and ultimately to the shaft is used for driving the compressor, which is likewise arranged on the shaft. The compressor conveys and compresses the charge air fed to it, and as a result, supercharging of cylinders of the internal combustion engine is obtained.

The advantage of an exhaust gas-driven turbocharger over a mechanical supercharger is that an exhaust gas turbocharger utilizes the exhaust gas energy of the hot exhaust gases, whereas a mechanical supercharger is driven by energy directly or indirectly from the internal combustion engine. In general, a mechanical or kinematic connection is used for the transmission of power between the supercharger and the internal combustion engine. Therefore, embodiments of the auto-ignition internal combustion engine are advantageous in which at least one exhaust gas turbocharger is provided, which comprises a turbine arranged in the exhaust gas discharge system and a compressor arranged in the intake system.

In this context, embodiments of the auto-ignition internal combustion engine are advantageous in which the turbine of the exhaust gas turbocharger is arranged in the exhaust gas discharge system upstream of the three-way catalytic converter.

It is beneficial to arrange the turbine of the exhaust gas turbocharger as close as possible to outlet openings of the cylinders in order to optimally use the enthalpy of the hot exhaust gases, which is determined significantly by the exhaust gas pressure and the exhaust gas temperature, and to ensure a fast response behavior of the turbine and thus of the turbocharger. Therefore, it is also fundamentally sought to minimize the thermal inertia and the volume of the line system between the outlet openings of the cylinders and of the turbine, which may be achieved by reducing the mass and the length of the exhaust lines.

If an exhaust gas turbocharging arrangement is provided, embodiments of the auto-ignition internal combustion engine are advantageous in which the turbine of at least one exhaust gas turbocharger is a variable geometry turbine. The variable geometry turbine increases the flexibility of the supercharging by permitting a continuously variable adaptation of the turbine geometry to the respective operating point of the internal combustion engine, in particular to the present exhaust gas flow conditions through the turbine. In a variable geometry turbine, guide blades for influencing the flow direction are arranged upstream of an impeller of the turbine. In contrast to impeller blades of the impeller, the guide blades do not rotate with the shaft of the turbine (e.g., with the impeller as it rotates). The guide blades are duly arranged so as to be stationary but not so as to be completely immovable, rather so as to be rotatable about their axis such that the flow approaching the impeller blades can be influenced. In contrast, if a turbine has a fixed, invariable geometry, the guide blades are stationary and completely immovable (e.g., rigidly fixed) if a guide device is provided.

In conjunction with an exhaust gas turbocharging arrangement, embodiments of the auto-ignition internal combustion engine are advantageous in which, between the turbine of the exhaust gas turbocharger and the three-way catalytic converter, a line for exhaust gas recirculation branches off from the exhaust gas discharge system, forming a first junction, and opens into the intake system.

Here, embodiments of the auto-ignition internal combustion engine are advantageous in which the line for exhaust gas recirculation opens into the intake system upstream of the compressor of the exhaust gas turbocharger.

Embodiments of the auto-ignition internal combustion engine are also advantageous in which a cooler is arranged in the line for exhaust gas recirculation. The cooling of the exhaust gas in the context of the recirculation arrangement increases the density of the exhaust gas and permits high recirculation rates. The mixture of fresh air and recirculated, cooled exhaust gas forms the charge air, which, in some cases, is supplied to a compressor and compressed. When the temperature of the recirculated hot exhaust gas falls in the cooler, condensate can form. For example, during the course of cooling the exhaust gas, a liquid previously contained in the exhaust gas and still in gaseous form, in particular water, may condense if the temperature of the exhaust gas drops below the dew point temperature of the liquid. However, condensate formation in the cooler is more desirable than condensate formation in the intake system. In the intake system, condensate and condensate droplets may lead to increased noise, increased emissions, and may damage the blades of the compressor.

In this context, embodiments of the auto-ignition internal combustion engine are advantageous in which a bypass line is provided for bypassing the cooler. The bypass line makes it possible for the cooler to be bypassed, in particular, in a warm-up phase of the engine, when cooling of exhaust gas for recirculation is not desired.

In this context, embodiments of the auto-ignition internal combustion engine are advantageous in which, upstream of the cooler, a first shut-off element is arranged in the line for exhaust gas recirculation. The first shut-off element serves to deactivate the exhaust gas recirculation arrangement together with the cooler and to adjust the recirculation rate. Additionally or alternatively, a second shut-off element may be arranged downstream of the cooler in the line for exhaust gas recirculation in which the shut-off element serves to adjust the recirculation rate.

Embodiments of the auto-ignition internal combustion engine are advantageous in which, for the aftertreatment of the exhaust gas in a second, superstoichiometric operating mode ($\lambda>1$) of the internal combustion engine, an exhaust gas aftertreatment system for reducing the nitrogen oxides in the exhaust gas is provided, said exhaust gas aftertreatment system being arranged in the exhaust gas discharge system in parallel with the three-way catalytic converter.

In the case of superstoichiometric operation of the internal combustion engine (e.g., operation with an excess of air, also referred to as "lean"), the nitrogen oxides in the exhaust gas cannot be reduced at the three-way catalyst owing to a lack of reducing agent (e.g., not enough hydrocarbons and carbon monoxide are available relative to the amount of $NO_x$ produced during lean conditions).

To reduce the nitrogen oxides, use may then be made of selective catalytic converters, so-called selective catalytic reduction (SCR) catalytic converters, in which a reducing agent is purposely introduced into the exhaust gas in order to selectively reduce the nitrogen oxides. In addition to ammonia and urea, unburned hydrocarbons may also be used as the reducing agent. The latter is also referred to as HC enrichment, with the unburned hydrocarbons being introduced directly into the exhaust gas discharge system or being fed in by way of engine-internal measures, for example, by way of a post-injection of additional fuel into the combustion chamber after the actual combustion event.

It is also possible to reduce $NO_x$ emissions by means of so-called $NO_x$ storage catalytic converters. Here, the nitrogen oxides are initially, during lean-burn operation of the internal combustion engine, absorbed (e.g., collected and stored) in the catalytic converter before being reduced during a regeneration phase, which may include, for example, substoichiometric operation ($\lambda<1$) of the internal combustion engine with a deficit of oxygen, wherein the unburned hydrocarbons serve as reducing agent. Further engine-internal possibilities for the enrichment of the exhaust gas with reducing agent, in particular unburned hydrocarbons, are exhaust gas recirculation and, in the case of diesel engines, throttling in the intake system. As has already been stated with regard to SCR catalytic converters, an enrichment of the exhaust gas with unburned hydrocarbons may also be realized by means of a post-injection of fuel, which is likewise to be regarded as an engine-internal measure. It is possible to dispense with engine-internal measures if the reducing agent is introduced directly into the exhaust gas discharge system, for example by injection of additional fuel or urea. During a regeneration phase, the nitrogen oxides are released and converted substantially into nitrogen dioxide, carbon dioxide and water.

Embodiments of the auto-ignition internal combustion engine are advantageous in which, for the aftertreatment of the exhaust gas in the second, superstoichiometric operating mode ($\lambda>1$) of the internal combustion engine, an oxidation catalytic converter is provided, said oxidation catalytic converter being arranged in the exhaust gas discharge system in parallel with the three-way catalytic converter.

In the presence of an excess of air, an oxidation catalytic converter may be provided in the exhaust gas discharge system for the oxidation of unburned hydrocarbons and carbon monoxide, in which the oxidation catalytic converter ensures an oxidation reaction using catalytic materials that increase the rate of certain oxidation reactions.

In the case of auto-ignition internal combustion engines in which a line for exhaust gas recirculation branches off from the exhaust gas discharge system upstream of the three-way catalytic converter, forming a first junction, embodiments are advantageous that include the exhaust gas aftertreatment system for reducing the nitrogen oxides and/or the oxidation catalytic converter in an exhaust line of the exhaust gas discharge system in which the exhaust line branches off from the exhaust gas discharge system, forming a second junction, between the first junction and the three-way catalytic converter and which the exhaust line opens into the exhaust gas discharge system, forming a third junction, downstream of the three-way catalytic converter.

In this context, embodiments of the auto-ignition internal combustion engine are advantageous in which a particle filter is provided for the aftertreatment of the exhaust gas, wherein said particle filter is preferably arranged in the exhaust gas discharge system downstream of the third junction. For example, to minimize the emissions of soot particles, a regenerative particle filter, which filters out and stores the soot particles from the exhaust gas, may be used. During filter regeneration, the soot particles are intermittently burned off. This process uses oxygen or an excess of air in the exhaust gas to oxidize the soot in the filter, which can be achieved, for example, by way of superstoichiometric operation ($\lambda > 1$) of the internal combustion engine.

The high temperatures used for the regeneration of the particle filter are, during operation, attained intermittently, for example in the presence of high loads and high engine speeds. In general, additional measures are implemented to ensure a regeneration of the filter under all operating conditions. According to embodiments of the present disclosure, the filter is flowed with exhaust gas continuously (e.g., both in the first, stoichiometric operating mode and in the second, superstoichiometric operating mode of the internal combustion engine). This contributes to the constant heating of the particle filter and prevents cooling of the filter. It is thereby ensured that the filter is active, in particular, during the second, superstoichiometric operating mode.

Here, embodiments of the auto-ignition internal combustion engine are advantageous in which, downstream of the particle filter, a recirculation line branches off from the exhaust gas discharge system, in which the recirculation line opens into the intake system and is equipped with a fourth shut-off element.

Here, embodiments of the auto-ignition internal combustion engine are also advantageous in which a first shut-off element is arranged in the line for exhaust gas recirculation, and, downstream of the particle filter, a recirculation line branches off from the exhaust gas discharge system, in which the recirculation line opens into the line for exhaust gas recirculation upstream of the first shut-off element, the recirculation line being equipped with the fourth shut-off element.

In the latter two embodiments, the recirculation line together with the fourth shut-off element serves for the recirculation of aftertreated exhaust gas in the second, superstoichiometric operating mode of the internal combustion engine. In some examples, it is possible to dispense with the fourth shut-off element, which serves primarily for the deactivation of the recirculation line.

Embodiments of the auto-ignition internal combustion engine are advantageous in which a third shut-off element is provided for the deactivation of the exhaust gas aftertreatment system for reducing the nitrogen oxides and/or of the oxidation catalytic converter, said third shut-off element being arranged upstream in the exhaust gas discharge system, for example, in the exhaust line that branches off from the exhaust gas discharge system upstream of the three-way catalytic converter and that is provided for bypassing the three-way catalytic converter.

Embodiments of the auto-ignition internal combustion engine are advantageous in which a second shut-off element is provided for the deactivation of the three-way catalytic converter, said second shut-off element being arranged in the exhaust gas discharge system upstream of the three-way catalytic converter, for example in the exhaust line in which the three-way catalytic converter is arranged.

Embodiments of the auto-ignition internal combustion engine are advantageous in which at least one exhaust gas turbocharger is provided and a charge-air cooler is arranged in the intake system downstream of the compressor of the exhaust gas turbocharger. The charge-air cooler acts to cool the compressed, heated charge air before it enters the cylinder. The charge-air cooler lowers the temperature and thereby increases the density of the charge air, such that the cooler also contributes to increased charging of the cylinders (e.g., a greater air mass is introduced).

In this context, embodiments of the auto-ignition internal combustion engine are advantageous in which a first bypass line is provided for bypassing the charge-air cooler. The first bypass line makes it possible for the charge-air cooler to be bypassed, in particular in the warm-up phase of the engine. Furthermore, bypassing of the charge-air cooler may be used for decreasing the volume of the intake system, whereby both the response behavior of the supercharging arrangement and the dynamics of the exhaust gas recirculation arrangement are increased. In the present case, both are particularly of interest in the first, stoichiometric operating mode.

Difficulties are generally encountered in achieving an increase in power in all engine speed ranges by means of exhaust gas turbocharging. A relatively severe torque drop is observed in the event of a certain engine speed being undershot. For example, if the engine speed is reduced, there is a smaller exhaust gas flow and therefore a lower turbine pressure ratio. Consequently, toward lower engine speeds, the charge pressure ratio likewise decreases.

Therefore, embodiments of the auto-ignition internal combustion engine are advantageous in which at least one exhaust gas turbocharger is provided and an additional compressor is arranged in the intake system downstream of the compressor of the exhaust gas turbocharger, in which the additional compressor is driven by an electric motor. Further, a second bypass line is provided that branches off from the intake system between the compressor of the exhaust gas turbocharger and the additional compressor and that opens into the intake system downstream of the additional compressor. An advantage of using a supercharger for the additional compressor over an exhaust gas turbocharger is that the supercharger generates, and makes available, the requested charge pressure at all times, regardless of the operating state of the internal combustion engine, including the present rotational speed of the crankshaft. This applies in particular to an electrically-driven compressor (e.g., a supercharger that is driven by an electric machine, also referred to as an "e-booster"). The additional compressor increases the torque characteristic of the internal combustion engine particularly in the first, stoichiometric operating mode and serves to realize satisfactory transient operating behavior (e.g., a good response behavior of the supercharging arrangement and increased dynamics of the exhaust gas recirculation arrangement).

In this context, embodiments of the auto-ignition internal combustion engine are advantageous in which an intercooler is arranged in the intake system between the compressor of the exhaust gas turbocharger and the additional compressor. The intercooler cools, in particular in the first operating mode, the charge air pre-compressed in the compressor of the exhaust gas turbocharger, such that thermal overloading of the additional compressor is prevented. Furthermore, compression by cooling is realized, such that the additional compressor can be of correspondingly small dimensions.

The second bypass line provided for bypassing the additional compressor may open into the intake system upstream of the charge-air cooler, for example, upstream of a branching point of a first bypass line that may be provided. Further, the second bypass line may branch off from the intake system downstream of the intercooler, for example, downstream of the opening-in point of a third bypass line that may be provided for bypassing the intercooler. The third bypass line may branch off from the intake system downstream of the compressor of the exhaust gas turbocharger. The third bypass line makes it possible for the intercooler to be bypassed, in particular, in a warm-up phase. Furthermore, bypassing of the intercooler may be used for decreasing the volume of the intake system, whereby both the response behavior of the supercharging arrangement and the dynamics of the exhaust gas recirculation arrangement are increased, which may be particularly beneficial in the first, stoichiometric operating mode. The three bypass lines described above may also be equipped with shut-off elements for the purposes of shutting off and opening up the respective bypass line.

Turning now to the figures, FIG. 1A schematically shows a first embodiment of an engine system 100, including an auto-ignition internal combustion engine 1, which has an intake system 2 for the supply of charge air to cylinders of the engine and an exhaust gas discharge system 3 for the discharge of exhaust gases. The internal combustion engine 1 is shown as a four-cylinder in-line engine 1a in which the four cylinders are arranged in a line (e.g., along the longitudinal axis of the cylinder head).

The internal combustion engine 1 is equipped with an exhaust gas turbocharger 6, which comprises a turbine 6a arranged in the exhaust gas discharge system 3 and a compressor 6b arranged in the intake system 2, the turbine 6a being a variable geometry turbine (indicated by an arrow). The hot exhaust gas expands in the turbine 6a of the exhaust gas turbocharger 6 with a release of energy that drives the associated compressor 6b, which compresses the charge air and supplies it via the intake system 2 and plenum to the cylinders, whereby supercharging of the internal combustion engine 1 is realized.

The auto-ignition internal combustion engine 1 illustrated in FIG. 1A may be operated in a stoichiometric first operating mode by way of a spatial ignition method (e.g., an HCCI method), as described below with respect to FIG. 2. For the aftertreatment of the exhaust gas in the stoichiometric first operating mode, a three-way catalytic converter 7 is provided, which reduces nitrogen oxides and oxidizes unburned hydrocarbons and carbon monoxide.

The three-way catalytic converter 7 is arranged downstream of the turbine 6a in the exhaust gas discharge system 3, wherein, for the purposes of deactivating the three-way catalytic converter 7, a second shut-off element 7a is arranged in the exhaust gas discharge system 3 upstream of the three-way catalytic converter 7, for example, in an exhaust line piece in which the three-way catalytic converter 7 is also arranged.

A line 11b for exhaust gas recirculation system 11 branches off from the exhaust gas discharge system 3, forming a first junction 11a, between the turbine 6a and the three-way catalytic converter 7. The line 11b opens into the intake system 2 upstream of the compressor 6b of the exhaust gas turbocharger 6. A cooler 11c and a first shut-off element 11d upstream of the cooler 11c are arranged in the line 11b of exhaust gas recirculation system 11. In the opening-in region of the line 11b, there is an EGR valve 11e which serves for the adjustment of the recirculation rate.

Extraction of the exhaust gas to be recirculated may occur, at least in the stoichiometric first operating mode, upstream of the three-way catalytic converter 7. As a result, a pressure loss across the three-way catalytic converter 7 is eliminated, and an adequately large pressure gradient between the exhaust gas discharge system 3 and the intake system 2 can be utilized in order to realize high recirculation rates. The larger pressure gradient furthermore contributes to an improvement in response behavior. In the stoichiometric, first operating mode, the exhaust gas contains no or virtually no soot particles, so aftertreatment of the exhaust gas to be recirculated with a particle filter 9 is not indicated. By extracting the exhaust gas to be recirculated upstream of the three-way catalytic converter 7, the line paths as to the cylinders are shortened and the line volumes are decreased. The exhaust gas recirculation system 11 is thereby more responsive to changes in EGR demand, for example.

For the aftertreatment of the exhaust gas in a second, superstoichiometric operating mode of the internal combustion engine 1, an exhaust gas aftertreatment system 8a for reducing nitrogen oxides and an oxidation catalytic converter 8b are provided and arranged in the exhaust gas discharge system 3 in parallel with the three-way catalytic converter 7. For example, the exhaust gas aftertreatment system 8a for reducing nitrogen oxides may be a lean $NO_x$ trap (LNT), an SCR, or the like. The exhaust gas aftertreatment system 8a for reducing nitrogen oxides and the oxidation catalytic converter 8b are provided in an exhaust line 3a of the exhaust gas discharge system 3. Exhaust line 3a branches off from the exhaust gas discharge system 3, forming a second junction 3b between the first junction 11a and the three-way catalytic converter 7, and opens into the exhaust gas discharge system 3 again downstream of the three-way catalytic converter 7, forming a third junction 3c. For the purposes of deactivating the exhaust gas aftertreatment system 8a and the oxidation catalytic converter 8b, a third shut-off element 8c is arranged upstream of the exhaust gas aftertreatment system 8a and the oxidation catalytic converter 8b in exhaust line 3a of the exhaust gas discharge system 3. The particle filter 9 is also provided for the aftertreatment of the exhaust gas, wherein the particle filter 9 is arranged in the exhaust gas discharge system 3 downstream of the third junction 3c. Thus, exhaust that flows through the three-way catalytic converter 7 or the exhaust gas aftertreatment system 8a and the oxidation catalytic converter 8b flows through the particle filter 9.

A recirculation line 9a branches off from the exhaust gas discharge system 3 downstream of the particle filter 9. The recirculation line 9a opens into the line 11b of the exhaust gas recirculation system 11 between the first shut-off element 11d and the cooler 11c and is equipped with a fourth shut-off element 9b. The fourth shut-off element 9b serves for the deactivation of the recirculation line 9a. The recirculation line 9a together with the fourth shut-off element 9b enables the recirculation of aftertreated exhaust gas in the second, superstoichiometric operating mode of the internal combustion engine 1.

An additional (e.g., second) compressor 10 is arranged in the intake system 2 downstream of the compressor 6b of the exhaust gas turbocharger 6 (e.g., the first compressor), in which the additional compressor can be driven by way of an electric motor 10a. A second bypass line 10b serves for bypassing the additional compressor 10. For this purpose, the second bypass line 10b branches off from the intake system 2 between the compressor 6b of the exhaust gas turbocharger 6 and the additional compressor 10 and opens into the intake system 2 again downstream of the additional compressor 10. A shut-off element 10c serves for the deactivation of the second bypass line 10b.

A charge-air cooler 4 is arranged in the intake system 2 downstream of the compressor 6b of the exhaust gas turbocharger 6 and the additional compressor 10. A first bypass line 4a is provided for bypassing the charge-air cooler 4, wherein a shut-off element 4b enables the deactivation of said first bypass line 4a.

An intercooler 5 is additionally arranged in the intake system 2 between the compressor 6b of the exhaust gas turbocharger 6 and the additional compressor 10. A third bypass line 5a is provided for bypassing the intercooler 5, wherein a shut-off element 5b enables the deactivation of said third bypass line 5a.

Engine system 100 may further include a control system 160. Control system 160 is shown receiving information from a plurality of sensors 162 and sending control signals to a plurality of actuators 164. Sensors 162 may include pressure, air flow, temperature, air/fuel ratio, and composition sensors, for example. Actuators 164 may include various control valves, fuel injectors, and guide blades of the variable geometry turbine 6a, for example. The control system 160 may include an electronic controller 166. The controller may receive input data from the various sensors, process the input data, and trigger the actuators in response to the processed input data based on instruction or code programmed therein corresponding to one or more routines. For example, the amount of compression provided to the cylinders of the auto-ignition internal combustion engine 1 via the exhaust gas turbocharger 6 and the additional compressor 10 may be varied by controller 166 based on engine operation conditions, as described below with respect to FIG. 2.

Figure 1B:
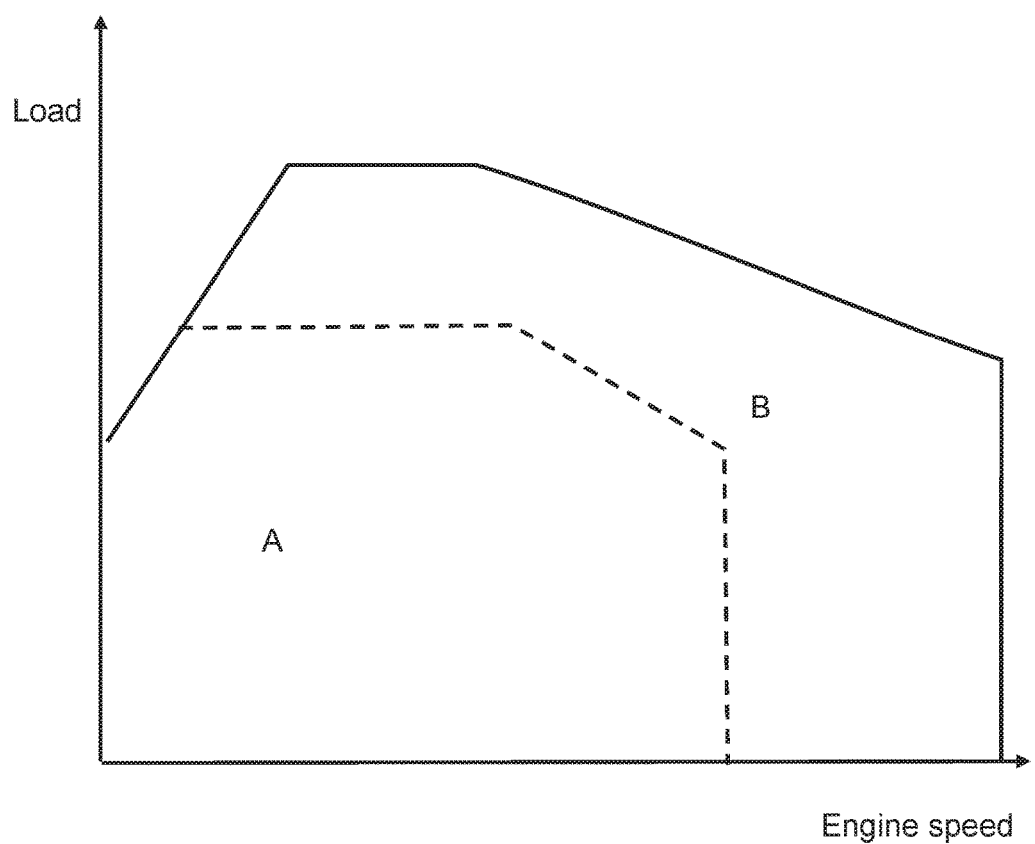
Figure 2:
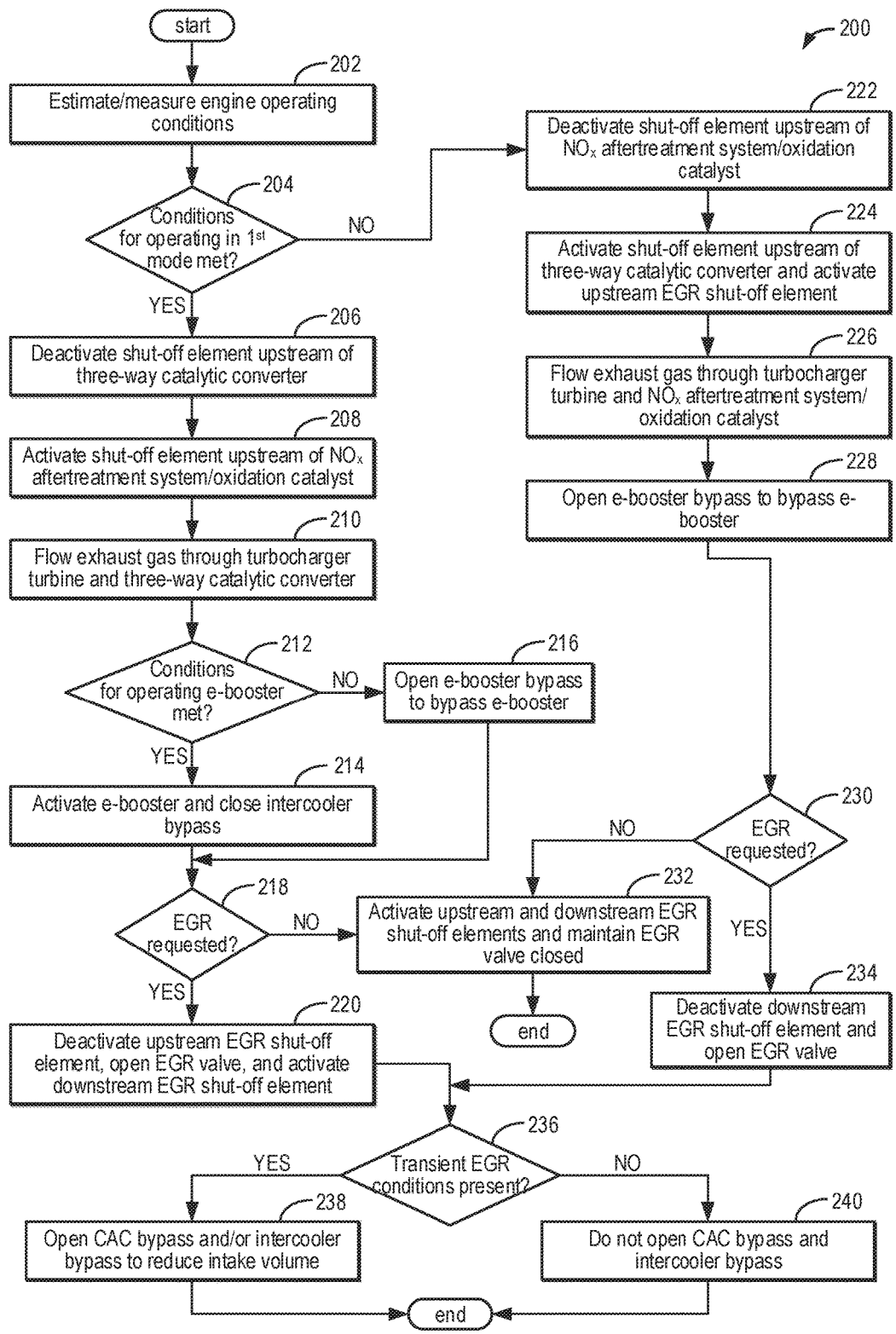
FIG. 2 is a flow chart of an example method for operating an internal combustion engine in a first operating mode and a second operating mode.

FIG. 1B schematically shows an example engine characteristic map associated with the internal combustion engine 1 illustrated in FIG. 1A. The engine characteristic map shows load as the Y-axis, with values increasing from bottom to top, and engine speed as the X-axis, with values increasing from left to right. The engine characteristic map shows the characteristic map regions of the two different operating modes A and B, wherein A denotes the stoichiometric first operating mode, and B denotes the superstoichiometric second operating mode. For example, the superstoichiometric second operating mode B is used at higher engine speeds and loads than the stoichiometric first operating mode A.

FIG. 2 shows a method 200 for operating an engine, such as the auto-ignition internal combustion engine 1 of FIG. 1A, in a first mode of operation (e.g., mode A of FIG. 1B, which is a stoichiometric HCCI mode) and a second mode of operation (e.g., mode B of FIG. 1B, which is a lean diesel combustion mode). Due to the different emission treatments used for the pollutants generated during combustion in each mode, an exhaust gas discharge system (e.g., exhaust gas discharge system 3 of FIG. 1A) of the engine may include a three-way catalytic converter (e.g., three-way catalytic converter 7 of FIG. 1A) for exhaust gas aftertreatment in the first mode and a $NO_x$ aftertreatment system (e.g., exhaust gas aftertreatment system 8a of FIG. 1A) and oxidation catalyst (e.g., oxidation catalytic converter 8b of FIG. 1A) for exhaust gas aftertreatment in the second mode. Further, the engine may include both a turbocharger (e.g., exhaust gas turbocharger 6 of FIG. 1A) and an e-booster (e.g., additional compressor 10 of FIG. 1A) in an intake system of the engine (e.g., intake system 2 of FIG. 1A) in order to provide the high charge pressure needed for HCCI operation. Instructions for carrying out method 200 may be executed by a controller (e.g., controller 166 of FIG. 1A) based on instructions stored on a memory of the controller and in conjunction with signals received from sensors of the engine system, such as the sensors described above with reference to FIG. 1A. The controller may employ engine actuators of the engine system to adjust engine operation according to the methods described below.

Method 200 begins at 202 and includes estimating and/or measuring engine operating conditions. Engine operating conditions may include manifold air pressure (MAP), manifold charge temperature (MCT), air-fuel ratio, fuel injection amount or timing, an EGR rate, mass air flow (MAF), engine speed and/or load, etc. Operating conditions may be measured using one or more sensors or estimated based on available data.

At 204, it is determined if conditions for operating in the first mode are met. Conditions for operating in the first mode may include engine speed being less than a threshold engine speed and engine load being less than a threshold engine load, for example, as defined by the bounds of region A in FIG. 1B.

If conditions for operating in the first mode are met, method 200 proceeds to 206 and includes deactivating a shut-off element located upstream of the three-way catalytic converter (e.g., second shut-off element 7a of FIG. 1A). During operation in the stoichiometric, first mode, the commanded air-fuel ratio may be maintained near stoichiometry, and the three-way catalytic converter may be sufficient for exhaust aftertreatment. Thus, deactivating the shut-off element upstream of the three-way catalytic converter enables activation of the three-way catalytic converter. Further, at 208, method 200 includes activating a shut-off element located upstream of the $NO_x$ aftertreatment system and the oxidation catalyst (e.g., third shut-off element 8c of FIG. 1A), as these aftertreatment devices are not used during operation in the first mode.

At 210, method 200 includes flowing exhaust through the turbocharger turbine and the three-way catalytic converter. Further, the exhaust gas may pass through a diesel particulate filter (e.g., particle filter 9 of FIG. 1A) before exiting the exhaust gas discharge system to the atmosphere. If, as in engine system 100 of FIG. 1A, the turbine is a variable geometry turbine, flowing exhaust through the turbocharger turbine may include adjusting the position of the guide blades in order to achieve a desired boosted intake air pressure. For example, the controller may determine the position of the guide blades using a look-up table with the input being the desired boosted intake air pressure and the output being the position of the guide blades. As another example, the controller may make a logical determination (e.g., regarding a position of the guide blades) based on logic rules that are a function of relevant engine operating conditions (e.g., engine speed/load, manifold air pressure, etc.). The controller may then generate a control signal that is sent to the guide blades.

At 212, method 200 includes determining if conditions for operating the e-booster are met. At low engine speeds, the amount of exhaust gas flowing through the turbine of the turbocharger may be insufficient to provide an amount of boost requested for high-pressure HCCI operation. Therefore, conditions for operating the e-booster may include the engine speed being below a second threshold engine speed or the engine speed being undershot by a threshold amount. Further, conditions for operating the e-booster may include a transient condition being present, such as an acceleration event or an engine cold start, or any condition in which the turbocharger compressor alone may not provide sufficient boost.

If conditions for operating the e-booster are met, method 200 proceeds to 214 and includes activating the e-booster and closing an intercooler bypass. For example, the e-booster may be activated by actuating an electric motor configured to drive the e-booster (e.g., electric motor 10a of FIG. 1A). The speed at which the e-booster is operated may be varied based on the amount of boost requested, with the operating speed increasing as the amount of boost requested increases. Further, as described with respect to FIG. 1A, an intercooler may be included between a compressor of the turbocharger and the e-booster, with a bypass passage (e.g., third bypass line 5a of FIG. 1A) for bypassing the intercooler controlled by a shut-off element therein (e.g., shut-off element 5b of FIG. 1A). During operation of the e-booster, the intercooler bypass may be kept closed or partially closed so that air compressed by the turbocharger compressor is cooled. Thereby, overheating of the e-booster is avoided.

If conditions for operating the e-booster are not met, method 200 proceeds to 216 and includes opening an e-booster bypass (e.g., second bypass line 10b of FIG. 1A) to bypass the e-booster. For example, a shut-off element positioned within the e-booster bypass line (e.g., shut-off element 10c of FIG. 1A) may be deactivated to enable air to flow through the e-booster bypass line. Further, the electric motor for driving the e-booster is not actuated.

Whether or not the e-booster is used, at 218, it is determined if EGR is requested. For example, EGR may be requested to attain a desired engine dilution, thereby improving fuel efficiency and emissions quality. Further, high EGR rates may be requested during operation in the first mode, as the combustion-inert recirculated exhaust gas helps to produce high charge pressures while maintaining low combustion temperatures. An amount of EGR requested may be based on engine operating conditions, including engine load, engine speed, engine temperature, etc., as described further below.

If EGR is requested, method 200 proceeds to 220 and includes deactivating an upstream EGR shut-off element, opening an EGR valve, and activating a downstream EGR shut-off element. The upstream EGR shut-off element (e.g., first shut-off element 11d of FIG. 1A) may control EGR pick-up through a recirculation line that is upstream of the catalysts and downstream of the turbocharger turbine (e.g., line 11b of FIG. 1A). The downstream EGR shut-off element (e.g., fourth shut-off element 9b of FIG. 1A) may control EGR pick-up through a recirculation line downstream of the particulate filter (e.g., recirculation line 9a of FIG. 1A). In the first operating mode, it may be desirable to have a smaller EGR air path volume for high EGR driving pressure and decreased response times. Further, since HCCI combustion results in low soot emissions, the exhaust for recirculation does not have to undergo filtering. Thus, deactivating the upstream EGR shut-off element, opening the EGR valve, and activating the downstream EGR shut-off element enables EGR pick-up upstream of the catalysts. Further, an amount of EGR provided to the intake may be controlled by adjusting the position of the EGR valve. The amount of EGR provided may be varied based on engine operating conditions, including combustion timing. For example, in the first operating mode, increasing the amount of EGR provided may delay the start of combustion, while decreasing the amount of EGR provided may advance the start of combustion. In one example, the controller may refer a look-up table having the a desired change in combustion timing as the input and a signal corresponding to a degree of opening to apply to the EGR valve as the output, the degree of opening providing a dilution amount corresponding to the input desired change in combustion timing. In still other examples, the controller may rely on a model that correlates a change in engine load with a change in the desired engine dilution and further correlates the change in the desired engine dilution with a change in the amount of EGR requested. For example, as engine load increases from a low load to a mid load, the amount of EGR requested may increase, and the EGR valve may be opened to a greater degree.

At 236, method 200 includes determining if transient EGR conditions are present. For example, transient EGR conditions may be present when the vehicle is not operating in steady-state, such as during an acceleration event or during a change in engine load. If transient EGR conditions are present, method 200 proceeds to 238 and includes opening a charge-air cooler (CAC) bypass and/or the intercooler bypass to reduce intake volume. For example, the shut-off element located within the intercooler bypass and a shut-off element (e.g., shut-off element 4b of FIG. 1A) located with the CAC bypass (e.g., first bypass line 4b of FIG. 1A) may be deactivated, thereby allowing air to flow through the respective bypass passages and not through the intercooler and the CAC. With the smaller intake volume, EGR rate may be controlled with a faster response time. However, opening of the intercooler bypass may be restricted by operation limitations of the e-booster in order to prevent the e-booster from overheating. Alternatively, opening of the CAC bypass and intercooler bypass may be performed to control charge air temperature, for example, during engine cold start, in which further cooling of the charge air is not desired. The controller may, for example, refer a look-up table to determine the degree of CAC bypass opening and/or the degree of intercooler bypass opening based on a desired charge air temperature and desired intake volume, with the desired charge air temperature and desired intake volume as inputs and the degree of CAC bypass opening and/or the degree of intercooler bypass opening as outputs. The controller may then generate control signals corresponding to the determined degrees of opening in order to adjust the positions of the respective shut-off elements. Following 238, method 200 ends.

If transient EGR conditions are not present at 236, method 200 proceeds to 240 and includes not opening the CAC bypass and the intercooler bypass. For example, the positions of the shut-off elements within the respective bypass lines may be maintained. However, as described above at 238, the positions of the shut-off elements within the CAC bypass and the intercooler bypass may be varied to control charge air temperature. Following 240, method 200 ends.

Returning to 218, if EGR is not requested, method 200 proceeds to 232 and includes activating the upstream and downstream EGR shut-off elements and maintaining the EGR valve closed. As such, the flow of exhaust gas through the recirculation lines will be prevented, and exhaust gas will not be recirculated. Following 232, method 200 ends.

Returning to 204, if conditions for operating in the first mode are not met, then it may be assumed that conditions for operating in the second mode are met, for example, as illustrated by the example engine characteristic map of FIG. 1B. As such, method 200 proceeds to 222 and includes deactivating the shut-off element (e.g., third shut-off element 8c of FIG. 1A) upstream of the $NO_x$ aftertreatment system and the oxidation catalyst. During operation in the superstoichiometric, second mode, the three-way catalytic converter may not be sufficient to reduce an excess of $NO_x$ produced during lean conditions. Thus, deactivating the shut-off element upstream of the $NO_x$ aftertreatment system and the oxidation catalyst enables activation of the $NO_x$ aftertreatment system and the oxidation catalyst for treating the exhaust gas. Further, at 224, method 200 includes activating the shut-off element located upstream of the three-way catalytic converter, as this aftertreatment device is not used during operation in the second mode.

With the flow path to the $NO_x$ aftertreatment system and the oxidation catalyst open and the flow path to the three-way catalytic converter closed, at 226, method 200 includes flowing the exhaust gas through the turbocharger turbine, the $NO_x$ aftertreatment system, and the oxidation catalyst. Further, the exhaust gas may pass through the diesel particulate filter before exiting the exhaust gas discharge system to the atmosphere.

At 228, method 200 includes opening the e-booster bypass to bypass the e-booster, as operation of the e-booster is not indicated during the second operating mode. For example, operation in the second mode does not use as high of a pressure as the first operating mode. Further, at the higher engine speeds of the second operating mode, the turbocharger may be sufficient to supply a desired amount of boost.

At 230, it is determined if EGR is requested. If EGR is not requested, method 200 proceeds to 232 and includes activating the upstream and downstream EGR shut-off elements and maintaining the EGR valve closed, as described above.

If EGR is requested at 230, method 200 proceeds to 234 and includes deactivating the downstream EGR shut-off element and opening the EGR valve. Further, the upstream EGR shut-off element is activated. Thus, while EGR in the first operating mode includes recirculating a portion of exhaust gas from upstream of the catalysts, EGR in the second operating mode includes recirculating a portion of exhaust gas from downstream of the diesel particulate filter. Thereby, soot produced during lean combustion will not be reintroduced to the cylinders through EGR.

Following 234, method 200 proceeds to 236 and includes determining if transient EGR conditions are present, as described above. If transient EGR conditions are present, method 200 proceeds to 238 and includes opening the CAC bypass and/or the intercooler bypass to reduce intake volume, as described above. If transient EGR conditions are not present, method 200 proceeds to 240 and includes not opening the CAC bypass and the intercooler bypass, as also described above. Further, the CAC bypass and intercooler bypass systems may be used to control charge air temperature for carbon monoxide and hydrocarbon feedgas limitations, which may be particularly beneficial during medium load conditions. Following both 238 and 240, method 200 ends.

Figure 3:
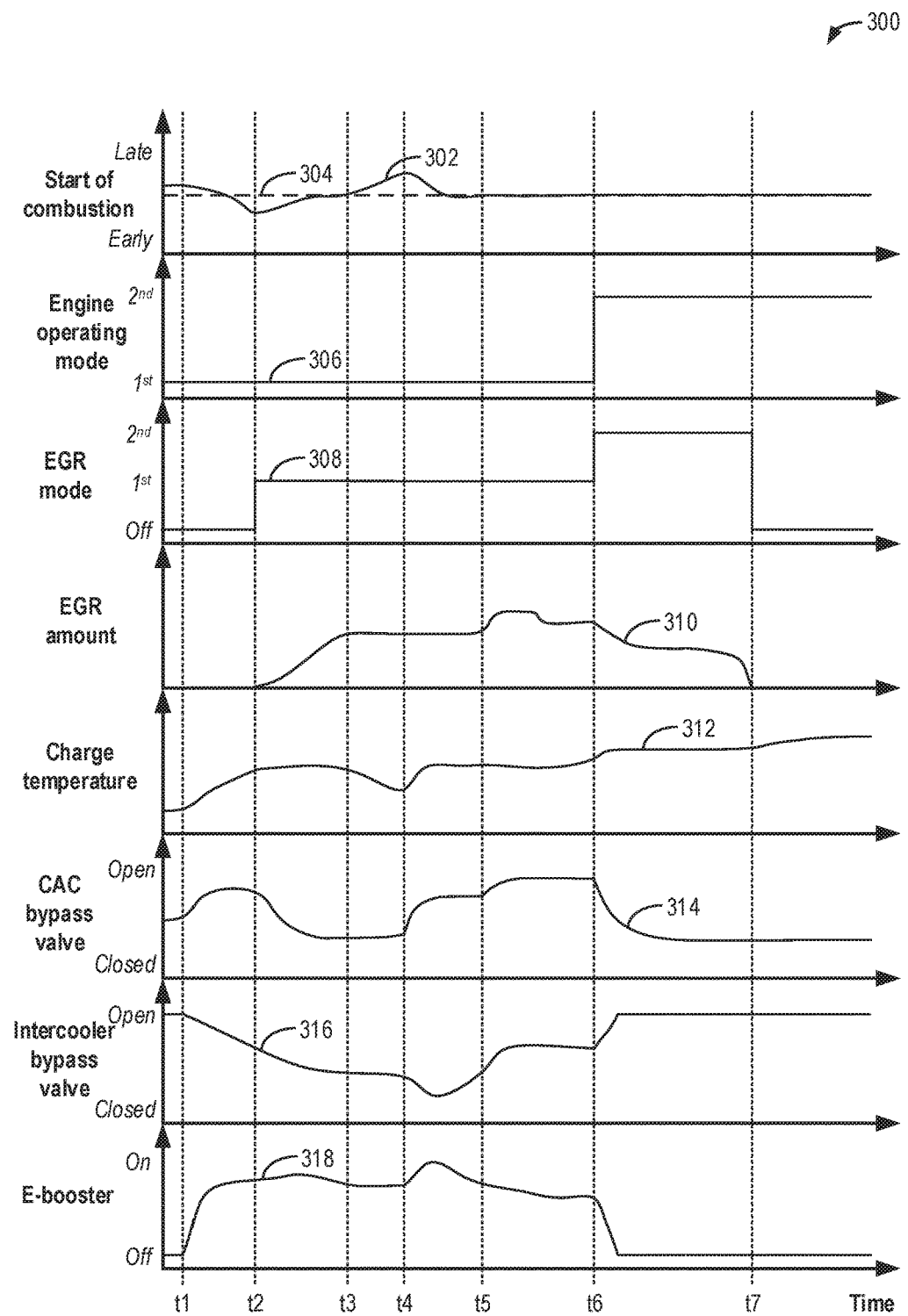
FIG. 3 is an example timing diagram illustrating the adjustment of various engine system components in order to produce a desired combustion timing in the first operating mode and the second operating mode.

Graph 300 of FIG. 3 shows an example timing diagram illustrating how components of a system for a turbocharged auto-ignition internal combustion engine (e.g., engine system 100 of FIG. 1A) may be adjusted, particularly in a first operating mode (e.g., mode A of FIG. 1B), in order to produce a desired combustion timing. The start of combustion (e.g., auto-ignition timing) is shown at plot 302, engine operating mode is shown at plot 306, EGR mode is shown at plot 308, EGR amount is shown at plot 310, charge temperature is shown at plot 312, charge-air cooler (CAC) bypass valve position is shown at plot 314, intercooler bypass valve position is shown at plot 316, and e-booster operation is shown at 318. Furthermore, dashed line 304 represents a desired start of combustion. For all of the above plots, the X-axis represents time, with time increasing along the X-axis from left to right. The Y-axis of each individual plot corresponds to the labeled parameter. For plots 310 and 312, the value of each parameter increases across the Y-axis from bottom to top. For plot 302, the Y-axis refers to combustion timing as early or late, with "early" corresponding to any value below the desired start of combustion (dashed line 304) and "late" corresponding to any value above the desired start of combustion. For plot 306, the Y-axis corresponds to the engine operating mode (first or second). For plot 308, the Y-axis reflects the EGR mode (off, first, or second). For plots 314 and 316, the Y-axis represents valve position (with "closed" referring to fully closed and "open" referring to fully open). Similarly, for plot 318, the Y-axis represents whether the e-booster is operated, with "off" referring to fully off and "on" referring to operating the e-booster at maximum speed.

Prior to t1, responsive to a key-on event, the engine is started. The engine is operated in the first operating mode (plot 306), a stoichiometric HCCI mode, at low engine speed and load, as described with respect to FIG. 2 and diagrammed in FIG. 1B. The engine may be in a cold start condition with a relatively low charge temperature (plot 312), which may result in a late start of combustion (plot 302). EGR is not requested and remains off (plot 308). As shown in the example of graph 300, a CAC bypass valve (e.g., shut-off element 4b of FIG. 1A) for controlling flow through a CAC bypass line (e.g., first bypass line 4a) may start in an intermediate position (plot 314) to allow dynamic control of charge temperature and intake volume. As also shown in the example of graph 300, an intercooler bypass valve (e.g., shut-off element 5b of FIG. 1A) for controlling flow through an intercooler bypass line (e.g., third bypass line 5a) may start in a fully open position (plot 316), as operation of an intercooler (e.g., intercooler 5 of FIG. 1A) located downstream of a compressor of a turbocharger and upstream of the e-booster (e.g., additional compressor 10 of FIG. 1A) may be dispensable at engine start.

At t1, the e-booster is turned on. Turning on the e-booster may include actuating an electric motor (e.g., electric motor 10a of FIG. 1A) configured to drive the e-booster, as described with respect to FIG. 1A. Further, operating the e-booster may include closing an e-booster bypass line (e.g., second bypass line 10b of FIG. 1A) so that air flows through the e-booster. The e-booster may be activated to a speed corresponding to an amount of boost requested, as described with respect to FIG. 2. The act of compressing intake air with the e-booster may help raise the charge temperature, as shown in plot 312. Further, increasing the opening of the CAC bypass valve, as shown in plot 314, may also help raise the charge temperature by enabling a greater portion of air to bypass the CAC. With the e-booster operating, the opening of the intercooler bypass valve (plot 316) is decreased in order to flow air through the intercooler to avoid overheating of the e-booster.

Between t1 and t2, as a result of the increase in charge temperature (plot 312) and activation of the e-booster (plot 318), the start of combustion becomes less delayed until the desired combustion timing (dashed line 304) is reached, as shown in plot 302. However, the start of combustion passes by the desired combustion timing and becomes early.

At t2, responsive to the start of combustion being early, EGR is requested, with an EGR system (e.g., EGR system 11) being operated in a first EGR mode. The first EGR mode corresponds to opening an EGR line (e.g., 11b of FIG. 1A) that is downstream of a turbine of the turbocharger and upstream of an exhaust gas discharge system (e.g., exhaust gas discharge system 3 of FIG. 1A), as described with respect to FIG. 1A and FIG. 2. With the EGR system being operated in the first EGR mode, the amount of EGR (plot 310) increases between t2 and t3 until a requested dilution is reached. The amount of EGR supplied may be controlled by varying the position of an EGR valve (e.g., EGR valve 11e of FIG. 1A), as described with respect to FIG. 2. The addition of EGR acts to delay the start of combustion (plot 302), which transitions from being early to being optimal (dashed line 304). Between t2 and t3, the CAC bypass valve is further closed (plot 314) and the intercooler bypass is further closed in order to maintain a desired charge temperature, as the addition of EGR may increase an outlet temperature of the compressor of the turbocharger and the e-booster.

Between t3 and t4, the start of combustion (plot 302) transitions to being late. For example, the charge temperature (plot 312) may decrease such that the start of combustion is delayed from the desired timing (dashed line 304). Beginning at t4, responsive to the start of combustion being late, the CAC bypass valve is opened to a greater degree (plot 314), enabling more air to bypass the CAC and avoid cooling by the CAC. Further, the e-booster is activated to a greater extent (plot 318), which may also contribute to increasing the charge temperature (plot 312) in addition to increasing the boost pressure. Even though an overall increase in charge temperature is desired, the intercooler bypass valve is further closed (plot 316) to direct a greater portion of intake air through the intercooler in order to keep the e-booster from overheating as it nears its maximum operating speed. Then, as the e-booster speed is decreased between t4 and t5 (plot 318), the opening of the intercooler bypass valve is increased (plot 316), allowing more air to go through the bypass and not through the intercooler.

Beginning at t5, transient EGR conditions are present, for example, due to an acceleration event, as further described with respect to FIG. 2. Responsive to transient EGR conditions being present, the CAC bypass valve (plot 314) is further opened and the intercooler bypass valve (plot 316) is further opened, reducing the intake volume and enabling the EGR rate to be controlled with a faster response time. As a result, the EGR amount quickly increases and then decreases again (plot 310) and the start of combustion (plot 302) is maintained at the desired timing (dashed line 304).

Beginning at t6, the engine transitions to the second operating mode (plot 306), for example, due to engine speed being greater than a threshold engine speed, as described with respect to FIG. 2. The second operating mode is a lean diesel combustion mode. As a result, the EGR mode transitions to the second EGR mode (plot 308). Transitioning to the second EGR mode includes closing the EGR line that is upstream of the exhaust gas discharge system and opening an EGR line (e.g., recirculation line 9a of FIG. 1A) that is downstream of an exhaust gas aftertreatment system (e.g., exhaust gas aftertreatment system 8a, oxidation catalytic converter 8b, and particle filter 9 of FIG. 1A) in order to remove pollutants and particulate matter from the exhaust gas to be recirculated, as described with respect to FIG. 2. In the example of graph 300, the amount of EGR requested decreases (plot 310) responsive to engine dilution demands in the second operating mode. Further, transitioning to the second engine operating mode includes deactivating the e-booster (plot 318). With the e-booster off, the intercooler bypass valve is fully opened to bypass the intercooler (plot 316) and the CAC bypass valve is further closed to direct a greater portion of air through the CAC. Additionally, the e-booster bypass line is so that charge air flows through the e-booster bypass line and not through the deactivated e-booster.

At t7, EGR is turned off (plot 308), for example, due to the engine transitioning to a high speed-load range where engine dilution is not requested, and EGR is not delivered (plot 310). Without the addition of cooled EGR, the charge temperature increases (plot 312). If the charge temperature becomes too high, the CAC bypass valve may be further closed and/or the intercooler bypass valve closed.

In this way, a system for a turbocharged auto-ignition internal combustion engine is provided that is configured to operate in a HCCI mode. Unlike traditional HCCI operation, which is typically lean-burning, the HCCI mode described herein operates at stoichiometry, with a three-way catalytic converter provided for efficient treatment of exhaust gas generated during the HCCI mode. Further, the system includes an additional mechanically or electronically-activated compressor for providing high boost, particularly at low engine speeds. Further still, the system includes a flexible low-pressure EGR system in which the air path volume can be varied based on engine operating status with sufficiently fast control properties. Thus, charge temperature and dilution can be sufficiently controlled by controlling an EGR amount and temperature, which aids the control of ignition timing in the HCCI mode. Together, the three-way catalyst, the additional compressor, and the flexible low-pressure EGR system extend the operating range of the HCCI mode and thereby reduce emissions and increase fuel efficiency.

The technical effect of using an e-booster, a flexible low-pressure EGR system, and a three-way catalytic converter is that the engine can be operated in the HCCI mode over a greater engine operating range, leading to reduced emissions and increased fuel economy.

As one example, a system is provided, comprising an intake system to supply charge air to an auto-ignition internal combustion engine; an exhaust gas discharge system for the discharge of exhaust gas from the engine; an exhaust gas recirculation arrangement to recirculate a portion of the exhaust gas into the intake system; and a three-way catalytic converter in the exhaust gas discharge system configured to reduce nitrogen oxides and oxidize unburned hydrocarbons and carbon monoxide in the exhaust gas when the internal combustion engine is operated in a first operating mode at a stoichiometric air-fuel ratio with homogenous charge compression ignition. In the preceding example, additionally or optionally, the system may further comprise an exhaust gas turbocharger, the exhaust gas turbocharger comprising a turbine arranged in the exhaust gas discharge system upstream of the three-way catalytic converter and a compressor arranged in the intake system. In any or all of the preceding examples, the system may additionally or optionally comprise a line for exhaust gas recirculation that branches off from the exhaust gas discharge system between the turbine and the three-way catalytic converter, forming a first junction, and opens into the intake system upstream of the compressor of the exhaust gas turbocharger; a cooler arranged in the line for exhaust gas recirculation; and a first shut-off element upstream of the cooler in the line for exhaust gas recirculation. In any or all of the preceding examples, the system may additionally or optionally comprise an exhaust gas aftertreatment system to reduce nitrogen oxides in the exhaust gas during operation in a super-stoichiometric second operating mode of the auto-ignition internal combustion engine, the exhaust gas aftertreatment system to reduce nitrogen oxides being arranged in an exhaust line of the exhaust gas discharge system in parallel with the three-way catalytic converter; an oxidation catalytic converter for aftertreatment of the exhaust gas during operation in the superstoichiometric second operating mode, the oxidation catalytic converter being arranged in the exhaust line of the exhaust gas discharge system in parallel with the three-way catalytic converter; a line for exhaust gas recirculation that branches off from the exhaust gas discharge system, forming a first junction, upstream of the three-way catalytic converter; a first shut-off element arranged in the line for exhaust gas recirculation; a second shut-off element for the deactivation of the three-way catalytic converter arranged in the exhaust gas discharge system upstream of the three-way catalytic converter; and a third shut-off element for the deactivation of the exhaust gas aftertreatment system to reduce nitrogen oxides and the oxidation catalytic converter, the third shut-off element being arranged in the exhaust gas discharge system upstream of the exhaust gas aftertreatment system to reduce nitrogen oxides and the oxidation catalytic converter. In any or all of the preceding examples, additionally or optionally, the exhaust line branches off from the exhaust gas discharge system, forming a second junction, between the first junction and the three-way catalytic converter and opens into the exhaust gas discharge system, forming a third junction, downstream of the three-way catalytic converter. In any or all of the preceding examples, the system may additionally or optionally comprise a particle filter for the aftertreatment of the exhaust gas, the particle filter being arranged in the exhaust gas discharge system downstream of the third junction; and a recirculation line that branches off from the exhaust gas discharge system downstream of the particle filter and opens into the intake system, the recirculation line being equipped with a fourth shut-off element. In any or all of the preceding examples, the system may additionally or optionally comprise an exhaust gas turbocharger, having a first compressor; a charge-air cooler that is arranged in the intake system downstream of a compressor of the exhaust gas turbocharger; and a first bypass line for bypassing the charge-air cooler. In any or all of the preceding examples, the system may additionally or optionally comprise a second compressor arranged in the intake system downstream of the first compressor, in which the second compressor is driven by an electric motor; a second bypass line that branches off from the intake system between the first compressor and the second compressor and opens into the intake system downstream of the second compressor; an intercooler arranged in the intake system between the first compressor and the second compressor; and a third bypass line that branches off from the intake system between the first compressor and the intercooler and opens into the intake system downstream of the intercooler and upstream of the second compressor.

As another example, a method is provided, comprising, in a first operating mode, operating an auto-ignition internal combustion engine stoichiometrically and flowing exhaust gas from the engine through a three-way catalytic converter; and in a second operating mode, operating the auto-ignition internal combustion engine superstoichiometrically, lean of stoichiometry, and flowing the exhaust gas through one or more of a lean $NO_x$ trap, a selective catalytic reduction catalyst, and a diesel oxidation catalyst. In the preceding example, additionally or optionally, the first operating mode is a homogeneous charge compression ignition mode. In any or all of the preceding examples, additionally or optionally, the first operating mode comprises a lower engine speed-load operating range and the second operating mode comprises a higher engine speed-load range. In any or all of the preceding examples, the method may additionally or optionally comprise in the first operating mode, using one or more of a first compressor and a second compressor to boost intake air; and in the second operating mode, using the first compressor to boost intake air. In any or all of the preceding examples, additionally or optionally, the first compressor is driven by an exhaust gas turbine and the second compressor is driven by an electric motor.

Another example method comprises, responsive to load of an auto-ignition internal combustion engine being less than a threshold engine load, engine speed being less than a threshold engine speed, and engine speed-load being less than a threshold engine speed-load, operating the engine in a homogeneous charge compression ignition mode at a stoichiometric air-fuel ratio. In the preceding example, the method may additionally or optionally comprise flowing exhaust gas through a three-way catalytic converter arranged in an exhaust gas discharge system for exhaust gas aftertreatment; and responsive to a request for exhaust gas recirculation, deactivating a shut-off element arranged in an exhaust gas recirculation line fluidically coupled to the exhaust gas discharge system and an intake system and opening an EGR valve to flow a portion of the exhaust gas through the exhaust gas recirculation line and to the intake system. In any or all of the preceding examples, additionally or optionally, exhaust gas recirculation is requested responsive to an indication of early combustion timing. In any or all of the preceding examples, additionally or optionally, the exhaust gas recirculation line is coupled to the exhaust gas discharge system upstream of the three-way catalytic converter and downstream of a turbine of a turbocharger and coupled to the intake system upstream of a compressor of the turbocharger and an additional, electrically-driven compressor, the additional, electrically-driven compressor being arranged in the intake system downstream of the compressor of the turbocharger. In any or all of the preceding examples, the method may additionally or optionally comprise, responsive to transient engine conditions, opening one or more of a first bypass line configured to bypass a charge-air cooler arranged in the intake system downstream of the additional, electrically-driven compressor and a second bypass line configured to bypass an intercooler arranged in the intake system upstream of the additional, electrically-driven compressor and downstream of the compressor of the turbocharger. In any or all of the preceding examples, additionally or optionally, at least one of the compressor of the turbocharger and the additional, electrically-driven compressor is operated under boosted conditions, and the method may additionally or optionally comprise opening a bypass line configured to bypass the additional, electrically-driven compressor when the additional, electrically-driven compressor is not operated.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an intake system to supply charge air to an auto-ignition internal combustion engine;
an exhaust gas discharge system for discharge of exhaust gas from the engine;
a three-way catalytic converter in the exhaust gas discharge system configured to reduce nitrogen oxides and oxidize unburned hydrocarbons and carbon monoxide in the exhaust gas when the internal combustion engine is operated in a first operating mode at a stoichiometric air-fuel ratio with homogenous charge compression ignition;
an exhaust gas aftertreatment system to reduce nitrogen oxides in the exhaust gas during operation in a superstoichiometric second operating mode of the auto-ignition internal combustion engine, the exhaust gas aftertreatment system to reduce nitrogen oxides being arranged in an exhaust line of the exhaust gas discharge system in parallel with the three-way catalytic converter;
a particle filter for aftertreatment of the exhaust gas, the particle filter being arranged in the exhaust gas discharge system downstream of each of the three-way catalytic converter and the exhaust gas aftertreatment system to reduce nitrogen oxides in the exhaust gas;
an exhaust gas turbocharger, the exhaust gas turbocharger comprising a turbine arranged in the exhaust gas discharge system upstream of the three-way catalytic converter and a first compressor arranged in the intake system; and
an exhaust gas recirculation arrangement to recirculate a portion of the exhaust gas into the intake system, the exhaust gas recirculation arrangement including a first line that branches off from the exhaust gas discharge system between the turbine and the three-way catalytic converter, forming a first junction, and opens into the intake system, the first line having a first shut-off element arranged therein, and a second line that branches off from the exhaust gas discharge system downstream of the particle filter and opens into the first line downstream of the first shut-off element, the second line having a second shut-off element arranged therein.

2. The system as claimed in claim 1, further comprising:
a second compressor arranged in the intake system downstream of the first compressor, the second compressor driven by an electric motor;
a bypass line that branches off from the intake system between the first compressor and the second compressor and opens into the intake system downstream of the second compressor; and
a third shut-off element arranged in the bypass line.

3. The system as claimed in claim 1, wherein the turbine is a variable geometry turbine.

4. The system as claimed in claim 1, further comprising a cooler arranged in the first line, and wherein the first line opens into the intake system upstream of the first compressor, and the first shut-off element is arranged upstream of the cooler in the first line.

5. The system as claimed in claim 1, further comprising:
an oxidation catalytic converter for aftertreatment of the exhaust gas during operation in the superstoichiometric second operating mode, the oxidation catalytic converter being arranged in the exhaust line of the exhaust gas discharge system in parallel with the three-way catalytic converter;
a third shut-off element for deactivation of the three-way catalytic converter arranged in the exhaust gas discharge system upstream of the three-way catalytic converter; and
a fourth shut-off element for deactivation of the exhaust gas aftertreatment system to reduce nitrogen oxides and the oxidation catalytic converter, the fourth shut-off element being arranged in the exhaust line upstream of the exhaust gas aftertreatment system to reduce nitrogen oxides and the oxidation catalytic converter.

6. The system as claimed in claim 5, wherein the exhaust line branches off from the exhaust gas discharge system, forming a second junction, between the first junction and the three-way catalytic converter and opens into the exhaust gas discharge system, forming a third junction, downstream of the three-way catalytic converter.

7. The system as claimed in claim 6, wherein the third shut-off element is arranged in the exhaust gas discharge system downstream of the second junction, and the particle filter is arranged in the exhaust gas discharge system downstream of the third junction.

8. The system as claimed in claim 1, further comprising:
a charge-air cooler that is arranged in the intake system downstream of the first compressor; and
a first bypass line for bypassing the charge-air cooler.

9. The system as claimed in claim 8, further comprising:
a second compressor arranged in the intake system downstream of the first compressor and upstream of the charge-air cooler, in which the second compressor is driven by an electric motor;
a second bypass line that branches off from the intake system between the first compressor and the second compressor and opens into the intake system downstream of the second compressor and upstream of the charge-air cooler;

an intercooler arranged in the intake system between the first compressor and the second compressor; and
a third bypass line that branches off from the intake system between the first compressor and the intercooler and opens into the intake system downstream of the intercooler and upstream of the second compressor.

10. A method, comprising:
in a first operating mode including a lower engine speed-load operating range, operating an auto-ignition internal combustion engine stoichiometrically flowing exhaust gas from the engine through a three-way catalytic converter, and recirculating exhaust gas from upstream of the three-way catalytic converter to an intake of the engine responsive to a request for exhaust gas recirculation; and
in a second operating mode including a higher engine speed-load operating range, operating the engine super-stoichiometrically, lean of stoichiometry, flowing the exhaust gas through a particulate filter and one or more of a lean $NO_x$ trap, a selective catalytic reduction catalyst, and a diesel oxidation catalyst, and recirculating exhaust gas from downstream of the particulate filter to the intake of the engine responsive to the request for exhaust gas recirculation.

11. The method as claimed in claim 10, wherein the first operating mode is a homogeneous charge compression ignition mode and the second operating mode is a lean diesel combustion mode.

12. The method as claimed in claim 10, further comprising:
in the first operating mode, using one or more of a first compressor and a second compressor to boost intake air; and
in the second operating mode, using the first compressor to boost intake air.

13. The method as claimed in claim 12, wherein the first compressor is driven by an exhaust gas turbine and the second compressor is driven by an electric motor.

14. A method, comprising:
responsive to a load of an auto-ignition internal combustion engine being less than a threshold engine load, engine speed being less than a threshold engine speed, and engine speed-load being less than a threshold engine speed-load, operating the engine in a homogeneous charge compression ignition mode at a stoichiometric air-fuel ratio including recirculating untreated exhaust gas from upstream of an exhaust gas aftertreatment system to an intake system of the engine responsive to a request for exhaust gas recirculation while operating the engine in the homogeneous charge compression ignition mode at the stoichiometric air-fuel ratio; and
responsive to the load being greater than the threshold engine load, the engine speed being greater than the threshold engine speed, and the engine speed-load being greater than the threshold engine speed-load, operating the engine in a lean diesel combustion mode, including recirculating exhaust gas from downstream of the exhaust gas aftertreatment system to the intake system of the engine responsive to the request for exhaust gas recirculation while operating the engine in the lean diesel combustion mode.

15. The method as claimed in claim 14, wherein:
the exhaust gas aftertreatment system is arranged in an exhaust gas discharge system of the engine and includes a three-way catalytic converter;
operating the engine in the homogeneous charge compression ignition mode at the stoichiometric air-fuel ratio further includes flowing exhaust gas through the three-way catalytic converter; and
recirculating untreated exhaust gas from upstream of the exhaust gas aftertreatment system includes, responsive to the request for exhaust gas recirculation, deactivating a first shut-off element arranged in a first exhaust gas recirculation line fluidically coupled to the exhaust gas discharge system and the intake system and opening an exhaust gas recirculation valve to flow a portion of the exhaust gas through the first exhaust gas recirculation line and to the intake system.

16. The method as claimed in claim 15, wherein the request for exhaust gas recirculation is responsive to an indication of early combustion timing.

17. The method as claimed in claim 15, wherein the first exhaust gas recirculation line is coupled to the exhaust gas discharge system upstream of the three-way catalytic converter and downstream of a turbine of a turbocharger and coupled to the intake system upstream of a compressor of the turbocharger and an additional, electrically-driven compressor, the additional, electrically-driven compressor being arranged in the intake system downstream of the compressor of the turbocharger, at least one of the compressor of the turbocharger and the additional, electrically-driven compressor operated under boosted conditions.

18. The method as claimed in claim 17, further comprising:
responsive to transient engine conditions, opening one or more of a first bypass line configured to bypass a charge-air cooler arranged in the intake system downstream of the additional, electrically-driven compressor and a second bypass line configured to bypass an intercooler arranged in the intake system upstream of the additional, electrically-driven compressor and downstream of the compressor of the turbocharger; and
opening a third bypass line configured to bypass the additional, electrically-driven compressor when the additional, electrically-driven compressor is not operated.

19. The method as claimed in claim 17, wherein:
the exhaust gas aftertreatment system further includes a lean NOx trap arranged in parallel with the three-way catalytic converter and a particle filter arranged downstream of the lean NOx trap and the three-way catalytic converter in the exhaust gas discharge system;
operating the engine in the lean diesel combustion mode further includes maintaining the first shut-off element active and flowing exhaust gas through the lean NOx trap and through the particle filter; and
recirculating exhaust gas from downstream of the exhaust gas aftertreatment system to the intake system of the engine includes, responsive to the request for exhaust gas recirculation, deactivating a second shut-off element arranged in a second exhaust gas recirculation line, the second exhaust gas recirculation line fluidically coupled to the exhaust gas discharge system downstream of the particle filter and to the first exhaust gas recirculation line downstream of the first shut-off element, and opening the exhaust gas recirculation valve to flow a portion of the exhaust gas through the second exhaust gas recirculation line and to the intake system via the first exhaust gas recirculation line.

* * * * *